United States Patent [19]

Andow

[11] 4,056,839
[45] Nov. 1, 1977

[54] PROTECTIVE RELAY DEVICES

[75] Inventor: Fumio Andow, Hachioji, Japan

[73] Assignee: Tokyo Shibaura Denki Kabushiki Kaisha, Japan

[21] Appl. No.: 650,159

[22] Filed: Jan. 19, 1976

[30] Foreign Application Priority Data

Jan. 20, 1975 Japan .................................. 50-7894

[51] Int. Cl.² ............................................. H02H 3/28
[52] U.S. Cl. ...................................... 361/68; 361/86; 361/110
[58] Field of Search ............ 317/36 TD, 50, 49, 27 R, 317/33 SC, 38

[56] References Cited

U.S. PATENT DOCUMENTS

| 3,602,776 | 8/1971 | Gonnam | 317/36 TD X |
| 3,644,789 | 2/1972 | Simpson | 317/36 TD |
| 3,657,605 | 4/1972 | Hill | 317/49 X |
| 3,893,008 | 7/1975 | Strickland, Jr. et al. | 317/27 R |
| 3,968,418 | 7/1976 | Kain et al. | 317/36 TD X |
| 3,970,901 | 7/1976 | Rohr | 317/49 |

Primary Examiner—J. D. Miller
Assistant Examiner—Patrick R. Salce
Attorney, Agent, or Firm—Stevens, Davis, Miller & Mosher

[57] ABSTRACT

In a static protective relay device utilizing a converter including a bandpass filter which causes time delay during transients, there are provided a detector responsive to the output from the converter, and means for preventing misoperation of the detector due to an attenuating oscillation of the output caused by the transient phenomenon of the converter which occurs during attenuation of the output.

11 Claims, 16 Drawing Figures

PROTECTIVE RELAY DEVICES

BACKGROUND OF THE INVENTION

This invention relates to a protective relay device of an electric power system.

Various static protective relay devices utilizing transistors or the like have been used to protect against such faults as short circuits and groundings occurring in an electric power system. As is well known to those skilled in the art, the static relay device misoperates when the input electric quantity contains a DC component or a high frequency component. To prevent such misoperation it has been necessary to insert a bandpass filter which passes only the fundamental frequency of the electric power system in the input circuit of the static relay device. However, when the input electric quantity decreases rapidly, the output from the bandpass filter attenuates over a long time at a frequency near the fundamental frequency of the electric power system. In order to prevent such misoperation caused by the transient phenomenon it is necessary to extend the operation or response time of the relay device. Especially, grounding relays responsive to zero phase currents or inverse phase currents, and differential relays utilized to protect generators or transformers have high sensitivities so that these relays do not operate until the filter output has attenuated sufficiently, thus greatly increasing the operating time of the relays.

Difficulties caused by the use of bandpass filters also occur in overcurrent relays, distance relays and phase comparison relays.

More particularly, when a section of a transmission line is protected by phase comparison relays, the output electric quantities of the bandpass filters located at the opposite ends of the section are applied to first and second level detectors respectively. When the output electric quantity at one end is larger than the detection level $L_1$ of the first detector at that end, the output electric quantity is sent to the other end through a transmitter. When the output electric quantity at the other end is larger than the output level $L_2$ of the second level detector at the other end, this electric quantity is applied to the phase comparison circuit at the other end which compares this electric quantity with the signal sent from the one end (a signal having a level larger than detection level $L_1$) to produce an output signal proportional to the overlapping angle (overlapping time) of the two signals. When a fault occurs in the protected section, the phases of both signals are substantially equal with the result that the overlapping angle becomes larger than a prescribed value necessary to trip circuit breakers thus producing a signal for tripping the same. When there is not fault on the transmission line, or in the case of an external fault, the phase difference between the two inputs to the phase comparison relay is nearly 180° so that the phase comparing circuit does not produce any tripping signal for the circuit breakers. However, when the external fault is cleared and as the electric quantities which have passed through the bandpass filters decrease rapidly the bandpass filters produce outputs which attenuate in an oscillatory manner as has been pointed out hereinabove. If the characteristics (the time constants at the time of discharge) of the bandpass filters at both ends do not coincide with each other the phase difference between the two outputs would become larger. Consequently, the phase difference between two signals applied to the phase comparing circuit gradually decreases. Finally, the two signals will come to overlap for more than a prescribed interval thereby producing a tripping signal for the circuit breakers.

This phenomenon becomes more remarkable as the current of the external fault increases.

SUMMARY OF THE INVENTION

Accordingly, it is an object of this invention to provide an improved protective relay device which does not misoperate even when the output of a converter including a delaying circuit element such as a bandpass filter attenuates in an oscillating manner over a long period due to transient phenomena at the time when the input electric quantity to the converter decreases rapidly.

According to this invention there is provided a protective relay device comprising a converter responsive to an electric quantity of an electric power system for producing an output proportional to the electric quantity, the converter including a time delay element, a detector responsive to the output from the converter, and means for preventing misoperation of the detector due to an attenuating oscillation of the output caused by the transient phenomena of the converter which occurs during the attenuation of the output.

The invention is applicable not only to an overload relay but also to a ratio differential relay, a phase comparison relay, a directional relay and a distance relay.

DESCRIPTION OF THE PREFERRED EMBODIMENT

Figure 1:
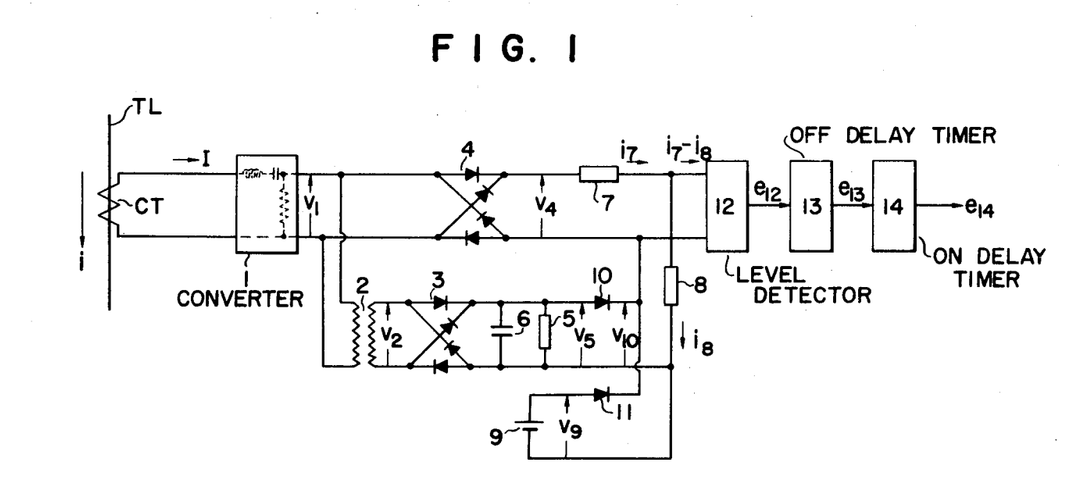
FIG. 1 is a connection diagram, partly in block form, showing one embodiment of this invention.
Figure 2:
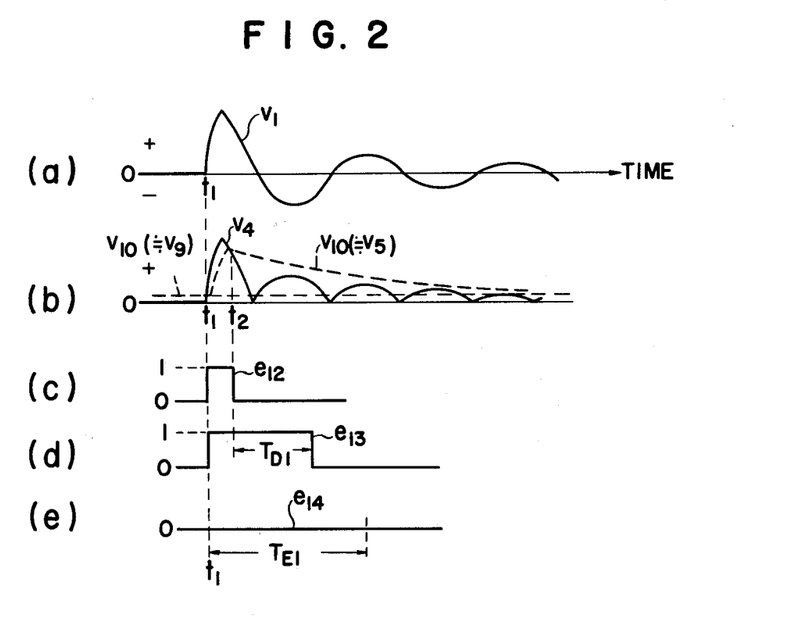
FIG. 2 shows waveforms of various components shown in FIG. 1 when a surge occurs.

FIG. 1 shows a first embodiment of this invention as applied to an overcurrent relay wherein the current $i$ flowing through a transmission line TL is detected by a current transformer CT and the output I of the current transformer is applied to a converter 1 including a bandpass filter as shown by dotted lines. The output voltage $v_1$ of the converter 1 is applied to a stepdown transformer 2 and a full wave rectifier 4. The output voltage $v_2$ of the transformer 2 is rectified by a full wave rectifier 3 and then applied to a capacitor 6 and a resistor 5 which are connected in parallel for smoothing to some extent the output from the full wave rectifier to produce a pulsating DC voltage $v_5$. The capacitor 6 is charged directly from the full wave rectifier 3 with a relatively small time constant of charging whereas capacitor 6 discharges through resistor 5 with a relatively large time constant. Thus, capacitor 6 acts as a memory device to store voltage $v_5$. The voltage $v_5$ is compared with the voltage $v_9$ of a DC source of constant voltage 9 through half wave rectifiers 10 and 11, whereby the larger one of the voltage $v_5$ and $v_9$ appears as a voltage $v_{10}$ as shown in FIG. 2b. The pulsating DC voltage $v_4$ from the full wave rectifier 4 passes current $i_7$ through a resistor 7, and voltage $v_{10}$ passes current $i_8$ through a resistor 8. The difference $(i_7 - i_8)$ is applied to a level detector 12, and the output $e_{12}$ thereof is applied to an OFF delay timer 13. The output $e_{13}$ from the off delay timer is applied to an ON delay timer 14 to produce an output $e_{14}$ which is used to operate the overcurrent relay, not shown.

The operation of the embodiment shown in FIG. 1 will be described with reference to FIGS. 2 and 3. FIG. 2 shows a case wherein a surge input is applied to converter 1 so that the output $v_1$ from the converter attenuates over a long period, as shown in FIG. 2a. The output $v_4$ from full wave rectifier 4 is an attenuating pulsating voltage having an instantaneous value equal to the absolute value of voltage $v_1$, as shown in FIG. 2b. The output voltage $v_2$ of the transformer 2 is smaller than voltage $v_1$ but proportional thereto and the voltage $v_5$ obtained by rectifying voltage $v_2$ by full wave rectifier 3 builds up rapidly and decreases slowly. The voltage $v_{10}$ is produced by half wave rectifier 10 or 11 and has a magnitude which is the same as that of the larger one of voltages $v_5$ and constant voltage $v_9$. For this reason, as shown in FIG. 2b, voltage $v_{10}$ is equal to voltage $v_9$ before an instant $t_1$ at which voltage $v_1$ begins to build up, but equal to voltage $v_5$ after instant $t_1$. The voltage $v_1$ builds up rapidly but soon begins to attenuate. Voltage $v_5$ attenuates more slowly than voltage $v_1$. For this reason, voltage $v_{10}$ builds up rapidly during the first half cycle of voltage $v_1$ but thereafter attenuates gradually. Voltage $v_4$ is larger than voltage $v_{10}$ only during the interval $t_1 - t_2$ in the first half cycle of voltage $v_1$ and after $t_2$, voltage $v_4$ is always smaller than voltage $v_{10}$. Currents $i_7$ and $i_8$ have the same waveforms as voltages $v_4$ and $v_{10}$ respectively. If resistors 7 and 8 have the same resistance value, the relation between the magnitudes of currents $i_7$ and $i_8$ would be equal to that between the magnitudes of voltages $v_4$ and $v_{10}$. Level detector 12 produces an output $e_{12}$ only when the difference between currents $i_7$ and $i_8$ is positive, that is $i_7 - i_8 > 0$, as shown in FIG. 2c. In other words, the output $e_{12}$ is produced during an interval $t_1 - t_2$ in which voltage $v_4$ is larger than $v_{10}$. This interval in which an output is produced exists only in the first half cycle of voltage $v_1$. The OFF delay timer 13 produces an output $e_{13}$ at the same time that the level detector 12 produces output $e_{12}$ and when output $e_{12}$ disappears the OFF delay timer 13 reduces its output $e_{13}$ to zero at a timer later than the extinguishment of $e_{12}$ by an interval $T_{D1}$ which is slightly longer than one half cycle of the frequency of the power system as shown in FIG. 2d. As shown in FIG. 2e, the ON delay timer 14 produces an output $e_{14}$ when the output $e_{13}$ from the OFF delay timer 13 persists for an interval $T_{E1}$ longer than one cycle of the power system and reduces to zero output $e_{14}$ when output $e_{13}$ disappears. In other words, ON delay timer 14 will not product output $e_{14}$ unless output $e_{13}$ persists longer than $T_{E1}$. Of course when output $e_{12}$ can be produced only during the first half cycle of the voltage $v_1$, output $e_{13}$ is not produced for an interval longer than the operating time of ON delay timer 14, whereby output $e_{14}$ would not be formed.

Figure 3:
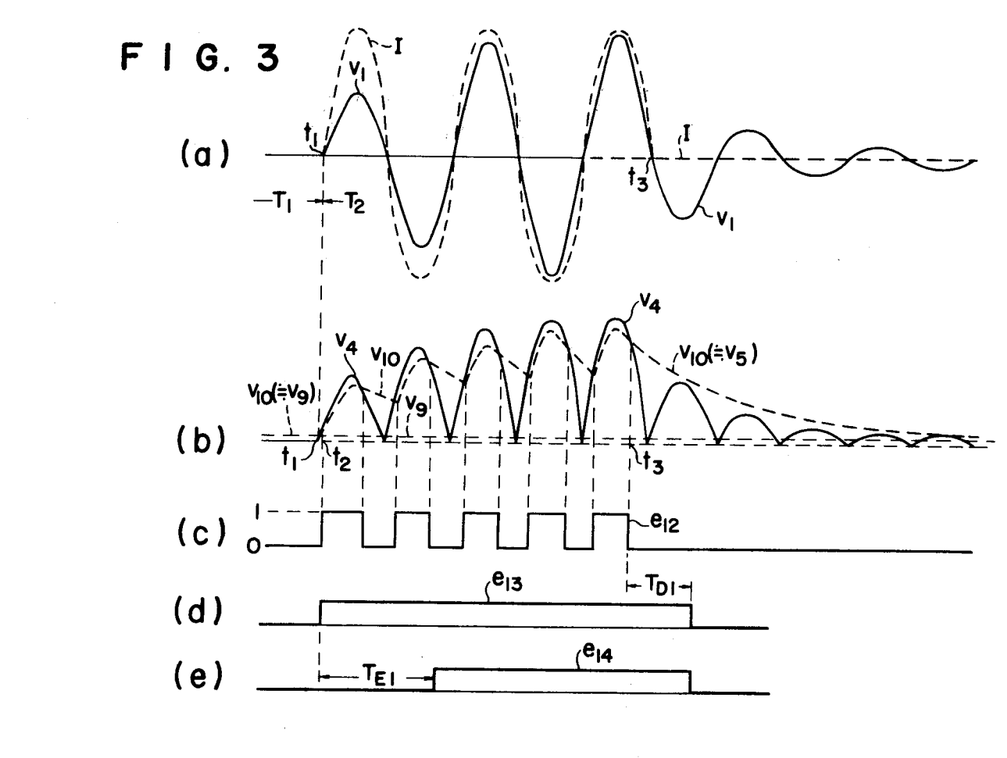
FIG. 3 shows waveforms of various components shown in FIG. 1 when a fault occurs.

FIG. 3 shows a condition wherein a large input current I caused by a fault of the power line is applied to the converter 1. Of course, current I does not decrease until a circuit breaker interrupts the power system. For this reason, as shown in FIG. 3a, voltage $v_1$ increases gradually from time $t_1$ at which the fault occurs until a steady value is reached, and attenuates gradually after the fault has been cleared at $t_3$. Since rectifier 4 is not provided with any smoothing circuit, voltage $v_4$ varies in accordance with voltage $v_1$, as shown in FIG. 3b. As shown in FIG. 3b, voltage $v_{10}$ repeats a rapid increase and gradual decrease during each half cycle of voltage $v_1$ while it is increasing and while it is maintained in the steady state. During this interval, voltage $v_4$ becomes larger than voltage $v_{10}$ during each half cycle of voltage $v_1$. For this reason, level detector 12 produces output $e_{12}$ in each half cycle of voltage $v_1$ as shown in FIG. 3c. During this interval the OFF delay timer 13 does not reset thus continuously producing output $e_{13}$, as shown in FIG. 13d, whereby ON delay timer 14 produces its output $e_{14}$. After the fault current I has been interrupted, since voltage $v_{10}$ attenuates more slowly than $v_4$, voltage $v_4$ would never exceed voltage $v_{10}$ whereby output $e_{12}$ would not be produced. Accordingly, outputs $e_{13}$ and $e_{14}$ soon disappear.

During the interval described above, irrespective of the presence of voltage $v_5$, the operating value of the protective relay does not vary except during an interval following the rapid decrease of the input current I. Thus, when the peak value of voltage $v_4$ is smaller than a value slightly larger than voltage $v_9$, the peak value of voltage $v_5$ is smaller than $v_9$ so that voltage $v_{10}$ is equal to voltage $v_9$. Even when the peak value of voltage $v_4$ exceeds said value, the peak value of voltage $v_5$ or $v_{10}$ is large unless voltage $v_4$ attenuates greatly. Accordingly, unless current I decreases rapidly and hence voltage $v_4$ attenuates greatly, the peak value of voltage $v_4$ is always larger than the peak value of $v_{10}$ whenever the peak value of voltage $v_4$ is larger than voltage $v_9$, thus producing output $e_{12}$ in each half cycle. Thus, the operating value is equal to the value of input current I at which the peak value of voltage $v_4$ is larger than voltage $v_9$. When current I decreases rapidly, even when the current I is larger than the operating value (which corresponds to $v_9$), the peak value of voltage $v_4$ does not exceeds voltage $v_{10}$ so that the relay cannot operate. However, this does not prevent normal protective operation of the relay because the rapid decrease of current I is caused by the clearance of the fault.

As can be noted from the foregoing description the embodiment shown in FIG. 1 provides an overload relay wherein a restraining voltage $v_5$ which is proportional to the output voltage $v_1$ from converter 1 and when the voltage $v_1$ decreases, decreases from the value of voltage $v_1$ before decrease is applied to level detector 12 which operates when the output voltage $v_1$ from converter 1 (which is proportional to input current I) exceeds a predetermined value, whereby detector 12 is rendered inoperative during an interval in which voltage $v_1$ decreases thus preventing the operation of the relay. Further, the ON delay timer 14 prevents the operation of the relay even when the level detector 12 operates at a time from which voltage $v_1$ begins to increase thereby eliminating misoperation of the relay caused by a surge current. The embodiment shown in FIG. 1 can also reduce the operating time of the relay.

Figure 4:
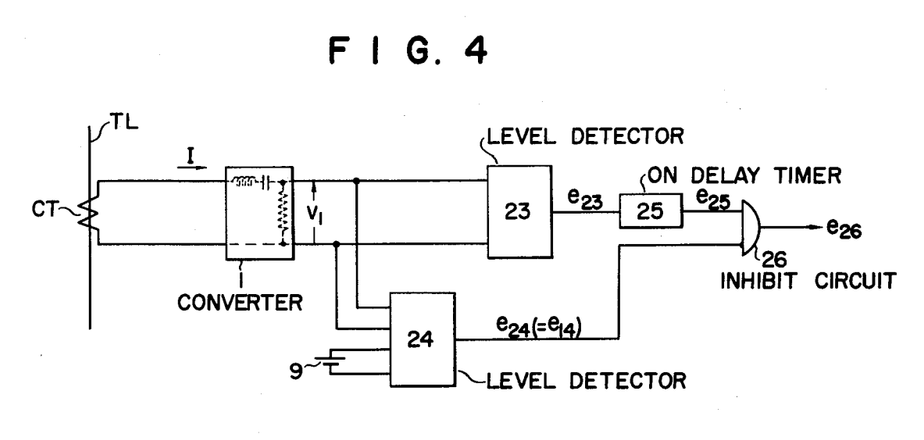
FIG. 4 shows a concentration diagram, partly in block form, showing a second embodiment of this invention.

FIG. 4 shows a second embodiment of this invention in which the operation of the protective relay is prevented during the attenuation of voltage $v_1$. In this modification the output $v_1$ from converter 1 including a time delay circuit element, is supplied to first and second level detectors 23 and 24 and the output $e_{23}$ from detector 23 is applied to an inhibit circuit 26 via an ON delay timer 25. Detector 23 has the same construction as that used for the overcurrent relay and operates to produce output $e_{23}$ when the voltage $v_1$ exceeds a definite value. On the other hand, detector 24 is constructed to produce output $e_{24}$ which is equal to output $e_{14}$ shown in FIG. 1. The detail of detector 24 will be described later with reference to FIG. 5. In response to output $e_{23}$ from detector 23 the ON delay timer 25 produces an output $e_{25}$ with a time delay equal to about one cycle of the power system and the output $e_{25}$ disappears when output $e_{23}$ becomes zero. As is well known in the art inhibit circuit 26 produces an output $e_{26}$ when output $e_{25}$ is produced but output $e_{24}$ is not. This output $e_{26}$ is used to operate the relay.

Figure 5:
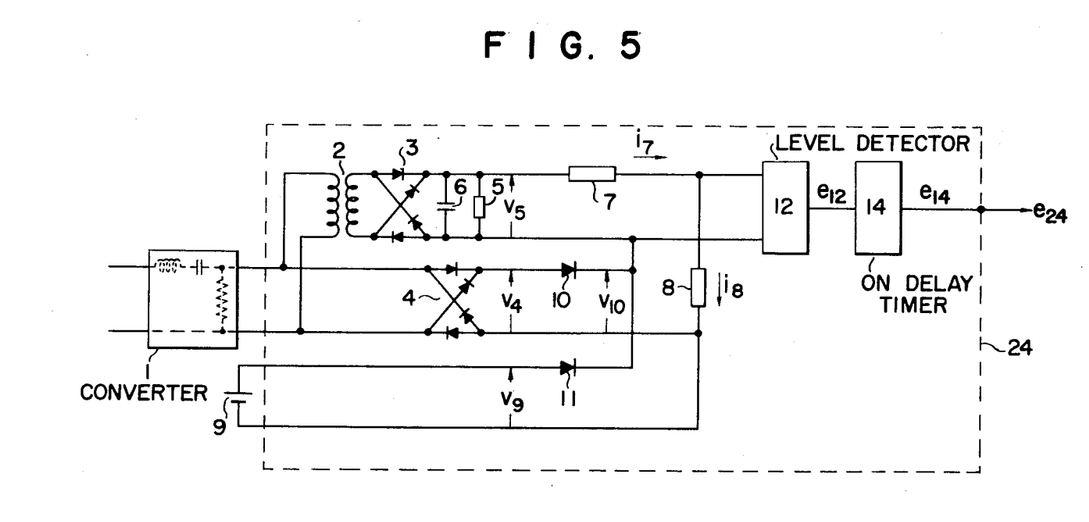
FIG. 5 is a connection diagram showing the detail of the level detector utilized in the embodiment shown in FIG. 1.

FIG. 5 shows one example of the construction of detector 24 in which elements identical to those shown in FIG. 1 are designated by the same reference charactors. Voltages $v_4$, $v_5$ and $v_9$ are obtained in the same manner as in FIG. 1. FIG. 5 is different from FIG. 1 in that voltages $v_4$ and $v_5$ are interchanged, that OFF delay detector 13 is omitted, and that the ON delay timer 14 is energized by output $e_{12}$ from level detector 12. The operating time of the ON delay timer 14 is selected to be slightly longer than one half cycle. Accordingly, output $e_{12}$ is obtained when the instantaneous value of voltage $v_5$ exceeds voltage $v_{10}$, and output $e_{14}$ is produced when output $e_{12}$ persists for an interval slightly longer than one half cycle. Output $e_{14}$ is used as the output from the detector 24.

Figure 6:
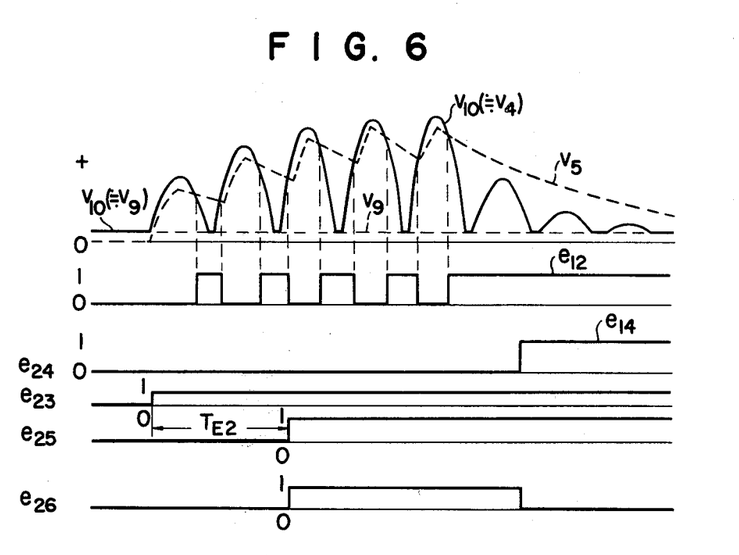
FIG. 6 shows waveforms useful to explain the operation of the embodiment shown in FIG. 4.

The operation of the embodiment shown in FIG. 4 will now be described with reference to FIG. 6 which corresponds to an internal fault of the power system. Voltage $v_{10}$ is equal to the larger one of voltages $v_4$ and $v_9$ as shown in FIG. 6. Until the fault is cleared, voltage $v_{10}$ does not attenuate and its peak value is larger than voltage $v_5$ so that output $e_{12}$ disappears at each peak of voltage $v_{10}$. Accordingly, during these inervals output $e_{12}$ is not produced, whereby output $e_{14}$ will not be produced. When the fault is cleared and voltage $v_{10}$ decreases, the peak value thereof becomes smaller than $v_5$. Accordingly, voltage $v_5$ is always larger than $v_{10}$ thus continuously producing output $e_{12}$, whereby output $e_{14}$ is produced about one half cycle later.

Detector 23 produces output $e_{23}$ at a predetermined level, for example when $v_1 > 0$ and the ON delay timer 25 produces output $e_{25}$ at an instant later by $TE_2$ than the time when voltage $v_{10}$ begins to increase. In response to output $e_{25}$, the inhibit circuit 26 produces output $e_{26}$ after interval $TE_2$. However, this output $e_{26}$ disappears when output $e_{24}$ or $e_{14}$ is produced.

In this manner, output $e_{26}$ which is used to operate the relay is produced about one cycle later than the building up of voltage $v_1$, but this output $e_{26}$ disappears immediately after interruption of the fault.

As has been described hereinabove, in the embodiment shown in FIG. 4, there is provided detector 24 which detects the attenuation of the output voltage $v_1$ from converter 1 for preventing the operation of the relay during the attenuation of voltage $v_1$ by preventing the control provided by detector 23 which operates when voltage $v_1$ is above a predetermined value thus preventing the misoperation of the relay caused by a surge.

While in the embodiments described above, the operation of the relay responsive to the output $v_1$ from the converter 1 having a delay characteristic is prevented by detector 24 which prevents the operation of the relay during the attenuation of voltage $v_1$, the same object can be attained by adding a time delay.

Figure 7:
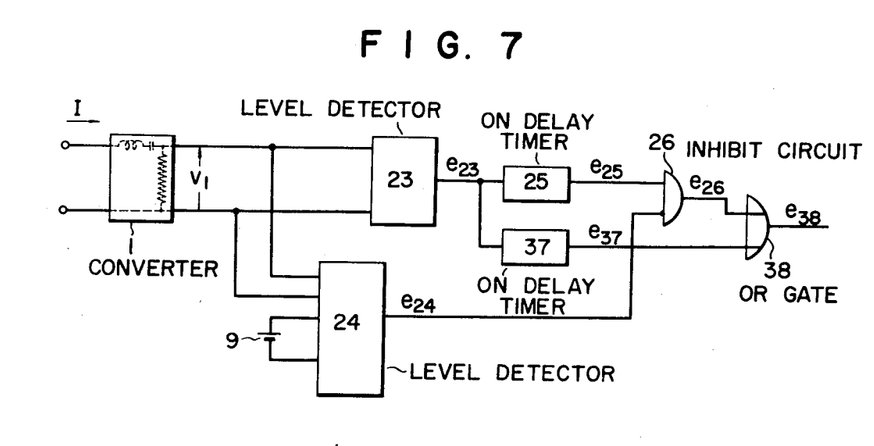
FIG. 7 is a block diagram showing a third embodiment of this invention.

FIG. 7 shows such modification in which circuit elements corresponding to those shown in FIG. 4 are designated by the same reference charactors. The embodiment shown in FIG. 7 is different from that shown in FIG. 4 in that an ON delay timer 37 is driven by the output $e_{23}$ from level detector 23 and its output $e_{37}$ is applied to an OR gate circuit 38 together with the output $e_{26}$ from the inhibit circuit 26 and that the output $e_{38}$ from the OR gate circuit is utilized to drive the protective relay. Output $e_{26}$ is equal to that shown in FIG. 4 and it not produced during the attenuation of voltage $v_1$. ON delay timer 37 produces output $e_{37}$ later than output $e_{23}$ but extinguishes output $e_{37}$ concurrently with output $e_{23}$. The delay time of output $e_{37}$ is made slightly longer than the time required for voltage $v_1$ to attenuate to a value smaller than $v_9$ shown in FIG. 2. Of course, this interval is longer than the interval in which ON delay timer 25 produces its output. For this reason, output $e_{37}$ does not cause misoperation at the time of a surge but upon occurrence of a fault produces an output delayed by a time corresponding to the operating time of the ON delay timer 37 irrespective of the operation of detector 24. Output $e_{38}$ for operating the relay is produced when either one of the ouputs $e_{26}$ and $e_{27}$ is produced. As a consequence, the embodiment shown in FIG. 7 operates in the same manner as the embodiment shown in FIG. 4 while the voltage $v_1$ is increasing and while it is maintained at a steady value, but during attenuation of voltage $v_1$ in which detector 24 operates, the generation of output $e_{26}$ or the operation of the relay is not prevented completely but delayed. In this manner, even when the operation of the relay is relayed during the attenuation of the output voltage $v_1$ from converter 1, it is possible to decrease the operating time of the relay without any misoperation thereof caused by a surge.

In the embodiment shown in FIG. 4, if the difference between the line currents at both ends of a section to be protected is used as current I and if a restraining force proportional to respective terminal currents is applied to detector 23 a ratio differential relay could be obtained.

Figure 8:
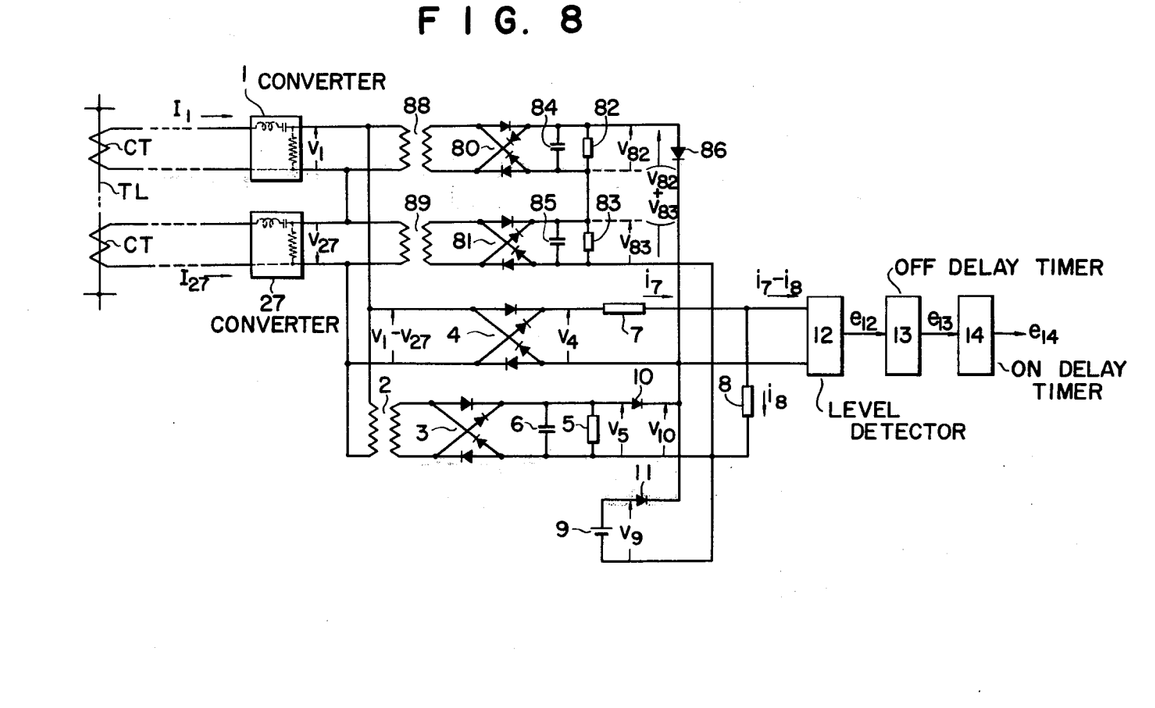
FIG. 8 is a connection diagram showing a fourth embodiment of this invention utilizing a ratio differential relay.

FIG. 8 shows one example of such ratio differential relay in which the elements corresponding to those shown in FIG. 1 are designated by the same reference characters. In FIG. 8, an additional converter 27 having the same construction as converter 1, transformers 88, 89, full wave rectifiers 80 and 81 resistors 82 and 83, capacitors 84 and 85 and a half wave rectifier 86 are added. Thus converters 1 and 27 are energized by currents $I_1$ and $I_{27}$ respectively at the opposite ends of the section to produce voltages $v_1$ and $v_{27}$, respectively. Voltages $v_1$ and $v_{27}$ produce proportional voltages on the secondary windings of transformers 88 and 89 and these secondary voltages are rectified by full wave rectifiers 80 and 81 respectively and the rectified voltages are smoothed by parallel circuit, respectively including capacitor 84 and resistor 82, and capacitor 85 and resistor 83, thereby producing smooth DC voltages $v_{82}$ and $v_{83}$. The outputs of converters 1 and 27 are connected in opposition for applying a difference voltage $(v_1 - v_{27})$ to full wave rectifier 4 and the primary of transformer 2 thereby producing voltages $v_4$ and $v_5$ and current $i_7$ in the same manner as in FIG. 1. Voltages $v_{82}$ and $v_{83}$ are added together to produce a sum voltage $(v_{82} + v_{83})$ as shown in FIG. 8. The sum voltage $(v_{82} + v_{83})$, voltage $v_5$ and constant voltage $v_9$ are combined through half wave rectifiers 86, 10 and 11 respectively to obtain voltage $v_{10}$ which is equal to the largest one of $(v_{82} + v_{83})$, $v_5$ and $v_9$ and which passes current $i_8$ through resistor 8. In the same manner as has been described in connection with FIG. 1 current $(i_7 - i_8)$ is detected by level detector 12, thus sequentially driving OFF delay timer 13 and ON delay timer 14.

The embodiment shown in FIG. 8 is different from that shown in FIG. 1 in that both voltages $v_4$ and $v_5$ are proportional to a voltage $(v_1 - v_{27})$ and that a voltage $(v_{82} + v_{83})$ is added to obtain voltage $v_{10}$. The voltage $(v_1 - v_{27})$ is proportional to the difference between $I_1$ and $I_{27}$ that is the differential current and current $i_7$ and voltage $v_5$ are proportional to the differential current. The voltage $(v_{82} + v_{83})$ is proportional to the sum of the effective values of currents $I_1$ and $I_{27}$. Voltage $v_{10}$ is equal to the larger one of voltages $v_5$, $v_9$ and $(v_{82} + v_{83})$. Neglecting the voltage $(v_{82} + v_{83})$, the embodiment shown in FIG. 8 provides an overcurrent relay which responds to the differential current (current due to the differential voltage $(v_1 + v_{27})$ and functions in the same manner as that shown in FIG. 1. Thus the overcurrent relay functions as shown in FIGS. 2 and 3, that is operates in response to the differential current but not to a surge current. Considering the functions of voltage $(v_{82} + v_{83})$, (i) if the voltage $(v_{82} + v_{83})$ is smaller than the peak value of voltage $v_4$ such that the polarity of either one of the currents $I_1$ and $I_{27}$ will have a polarity opposite to that shown in the drawing, voltage $v_{10}$ would be small and output $e_{12}$ would always be produced near the peak value of voltage $v_4$ whereby output $e_{14}$ would be obtained to operate the relay, (ii) whereas when voltage $(v_{82} + v_{83})$ is larger than the peak value of voltage $v_4$ such that currents $I_1$ and $I_{27}$ would have polarities as shown in the drawing, the voltage $v_{10}$ would also be large with the result that output $e_{12}$ would not be produced whereby the relay would not be operated. Thus, the embodiment shown in FIG. 8 operates as a ratio differential relay which does not responds to surge currents but operates when the differential currents becomes larger than the sum of the currents at both ends of a section to be protected at a prescribed ratio.

Figure 9:
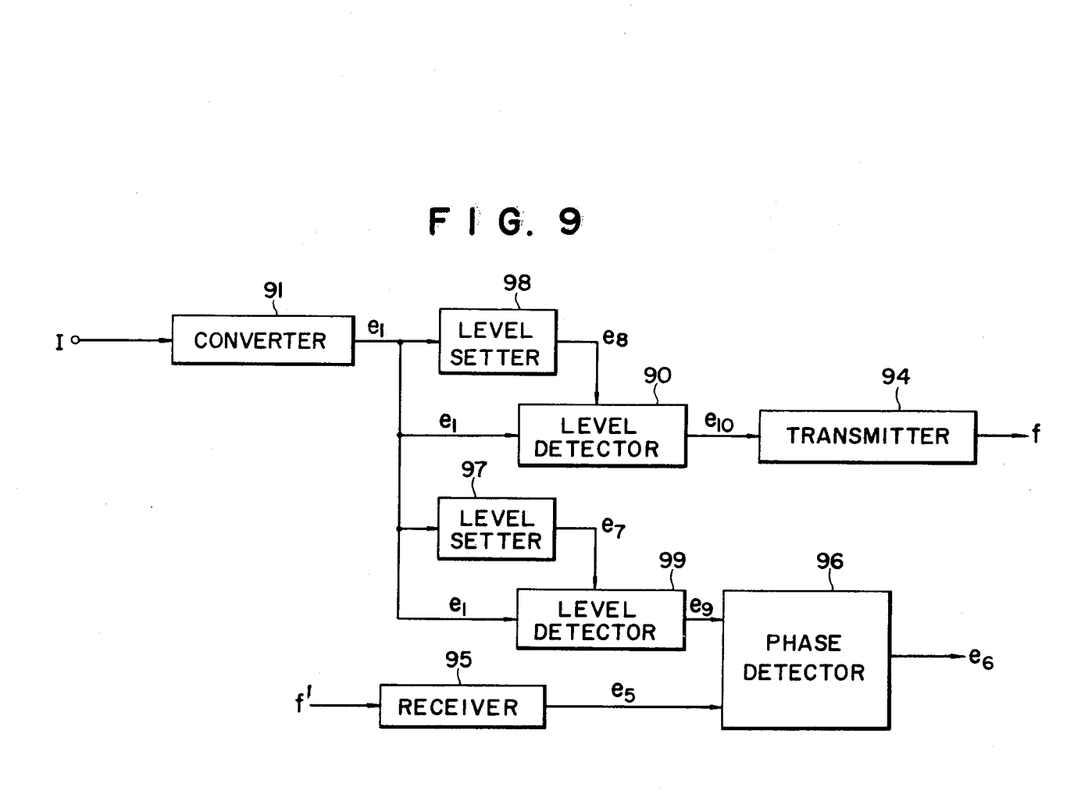
FIG. 9 is a block diagram showing a fifth embodiment of this invention utilizing a phase comparison relay.
Figure 10:
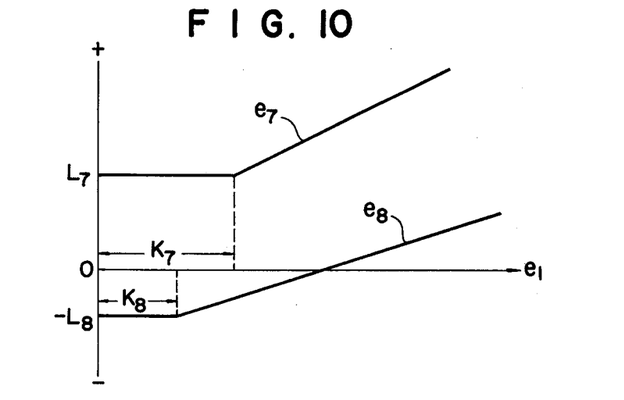
FIG. 10 is a graph showing the characteristics of the level setter used in the fifth embodiment.

FIG. 9 shows another embodiment of this invention applied to a phase comparison relaying device. It should be understood that identical relaying devices are installed at all terminals of the sections of a power transmission system. The relaying device shown in FIG. 9 comprises a converter 91, level setters 97 and 98 connected to the output of the converter, level detectors 99 and 90, a transmitter 94, a receiver 95 and a phase detector 96. The level setters 97 and 98 produces outputs $e_7$ and $e_8$ in response to the output $e_1$ from the converter 1. Under steady state, the outputs $e_1$, $e_7$ and $e_8$ have magnitudes as shown in FIG. 10. More particularly, so long as $e_1$ is smaller than a definite value $K_7$, the output $e_7$ has a positive constant level $L_7$ but when $e_1$ exceeds the definite value $K_7$, output $e_7$ increases in proportion to $e_1$. So long as $e_1$ is smaller than a definite value $K_8$, output $e_8$ has a negative constant value but when $e_1$ exceeds the definite value $K_8$, $e_8$ increases in the positive direction. The values of $e_7$ and $e_8$ are selected to be less than $\frac{1}{2}$, preferably less than $\frac{1}{4}$ of the peak value of the output $e_1$, and like a conventional phase comparison relaying device $e_7$ and $e_8$ are selected to satisfy the relation $e_7 > -e_8$ in this range. $e_1$, $e_7$ and $e_8$ are also related such that when $e_7$ increases, $e_7$ and $e_8$ vary rapidly whereas when $e_1$ decreases, $e_7$ and $e_8$ vary gradually. In other words, the rate of increase of $e_7$ and $e_8$ is large whereas the rate of decrease thereof is small and such variations are temporarily stored in a memory device, not shown. Level detectors 99 and 90 produces outputs $e_9$ and $e_{10}$ when the instantaneous value of their inputs $e_1$ is more positive than the outputs $e_7$ or $e_8$ from the level setters. The outputs $e_9$ and $e_{10}$ are used instead of the outputs $e_2$ and $e_3$ shown in FIG. 2 for effecting phase comparison as will be described later.

Figure 11:
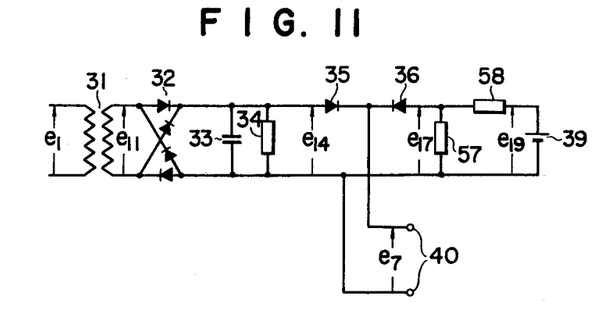
FIG. 11 is a connection diagram showing the detail of level setter 97 utilized in the fifth embodiment.

FIG. 11 shows one example of the level setter 97 shown in FIG. 9 in which input $e_1$ is supplied as a voltage. The level setter comprises a transformer 31, a full wave rectifier 32, a capacitor 33, resistors 34, 37 and 38, half wave rectifiers 35 and 36, a source of constant voltage 39 and output terminals 40 which are connected to level detector 29 or 30. The output $e_{11}$ of transformer 31 is rectified by full wave rectifier 32 and the output thereof is applied across capacitor 33 and resistor 34 which are connected in parallel to produce voltage $e_{14}$. The voltage $e_{19}$ of the constant voltage source 39 is divided by potentiometer resistors 57 and 58 to produce a fractional constant voltage $e_{17}$. Voltages $e_{14}$ and $e_{17}$ are compared by half wave rectifiers 35 and 36 to produce an output $e_7$ across terminals 40. Voltage $e_{14}$ is proportional to voltage $e_{11}$ and hence proportional to input voltage $e_1$. Voltage $e_{14}$ has a smooth waveform due to the smoothing action of capacitor 33 and resistor 34. When the instantaneous value of voltage $e_{11}$ is larger than the rectified voltage $e_{14}$, the capacitor 33 is charged so that voltage $e_{14}$ increases rapidly with a small time constant. On the other hand, when the instantaneous value of voltage $e_{11}$ is smaller than rectified value $e_{14}$, capacitor 33 discharges through resistor 34 with a large time constant thus gradually decreasing voltage $e_{14}$. The larger one of the voltages $e_{14}$ and $e_{17}$ is derived out as the output voltage $e_7$ by the action of half wave rectifiers 35 and 36. Consequently, while input $e_1$ and hence voltage $e_{14}$ is small output $e_7$ is equal to constant voltage $e_{17}$ whereas where input $e_1$ becomes larger so that $e_{14}$ becomes larger than the constant voltage $e_{17}$, the output $e_7$ becomes equal to voltage $e_{14}$ thus producing voltage $e_7$ having a characteristic as shown in FIG. 10. The constant voltage $e_{17}$ has a level $L_7$ shown in FIG. 10.

Figure 12:
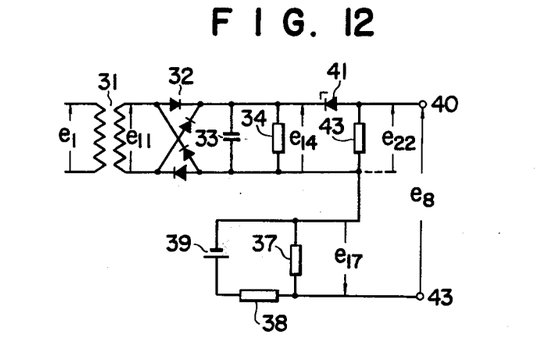
FIG. 12 is a connection diagram showing the detail of level setter 98 utilized in the fith embodiment.
Figure 13:
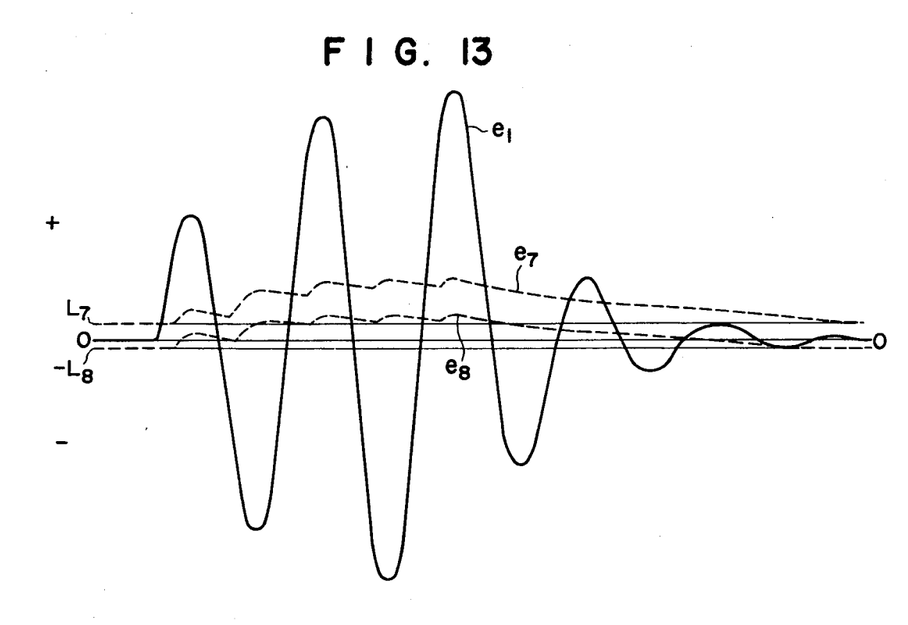
FIG. 13 is a graph showing the output characteristics of the level setters 97 and 98 when a fault current flows.

FIG. 12 shows a connection diagram of one example of level setter 98 wherein input $e_1$ is applied as a voltage, in which elements corresponding to those shown in FIG. 11 are designated by the same reference numerals. In FIG. 12 a Zener diode 41 and a resistor 43 are connected in series across resistor 34. Elements for producing $e_{14}$ and $e_{17}$ are identical to those shown in FIG. 11 so that the description thereof is believed unnecessary. Voltage $e_{14}$ is divided by the Zener diode 41 and resistor 43 to produce voltage $e_{22}$. When voltage $e_{14}$ is smaller than the Zener voltage of the Zener diode 41 voltage $e_{22}$ will not be produced whereas when voltage $e_{14}$ exceeds the Zener voltage, voltage $e_{22}$ equal to their difference will be produced. Accordingly, an output $e_8$ equal to the difference between voltage $e_{22}$ and $e_{17}$ appears across output terminals 40. Thus while voltage $e$, and hence $e_{14}$ are small, voltage $e_7$ (see FIG. 10) is equal to $-e_{17}$ whereas when $e_1$ and $e_{14}$ becomes larger than the Zener voltage of the Zener diode 41, voltage $e_8$ increases with voltage $e_1$ as shown in FIG. 10. The constant voltage $-e_{17}$ is equal to $-L_8$ shown in FIG. 10. Further $|L_7| > |L_8|$ The operations of the level setters shown in FIGS. 11 and 12 under a transient condition will now be considered with reference to FIG. 13. Assume now that current $i$ flows through the transmission line $T_L$ for a short interval thereby changing input voltage $e_1$ as shown in FIG. 13. When there is no input $e_1$, the voltages $e_7$ and $e_8$ produced by level setters 97 and 98 have levels $L_7$ and $-L_8$, respectively, but when the instantaneous value of the voltage $e_1$ exceeds a value corresponding to level $K_7$ or $K_8$, the voltages $e_7$ and $e_8$ increases rapidly until $v_1$ reaches its peak value. After voltage $e_1$ has passed through its peak value voltages $e_7$ and $e_8$ attenuate slowly. However, until $e_1$ begins to decrease each time the voltage $e_1$ reaches its peak value, voltages $e_7$ and $e_8$ reaches a value corresponding to the peak value of voltage $e_1$. When current I and hence voltage $e_1$ reduce to zero, voltages $e_7$ and $e_8$ gradually attenuate to $L_7$ and $-L_8$ respectively. This large variation of the current is thus memorized.

Having described the construction and operation of the level setters, the operation of the phase comparison relaying device shown in FIG. 9 will be described as follows.

Figures 14, 15, 16:
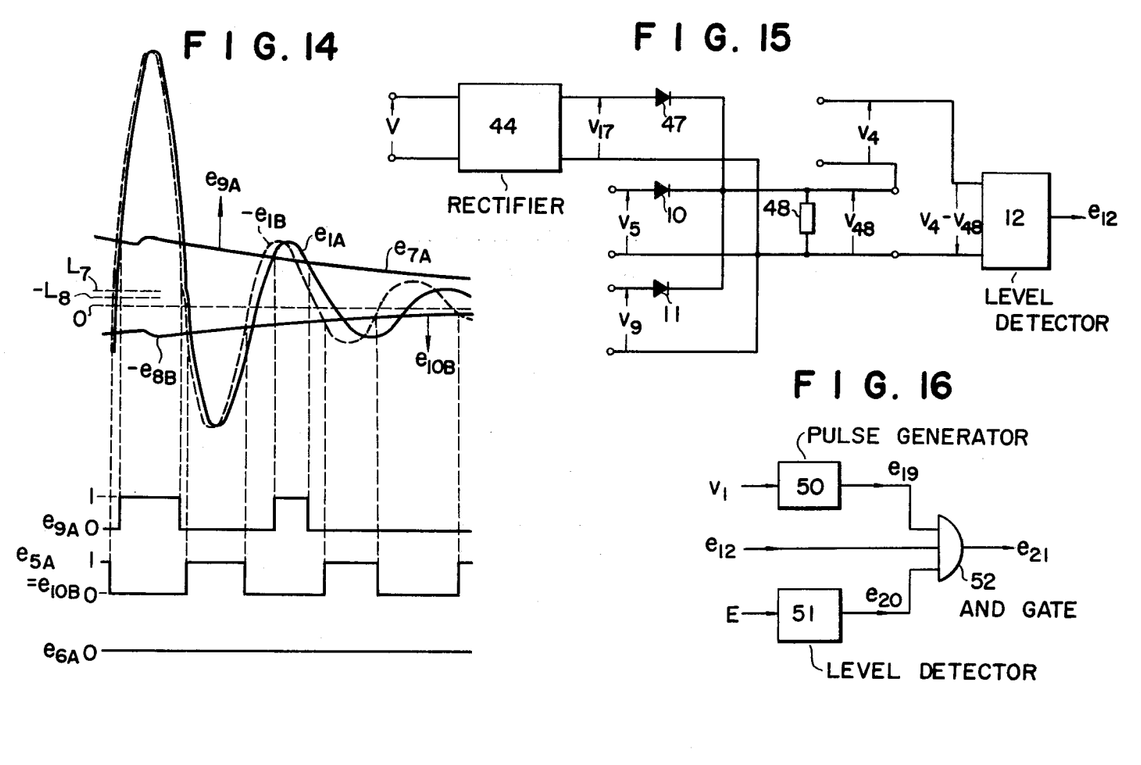
FIG. 14 shows waveforms useful to explain the operation of the phase comparison relay utilized in the fifth embodiment.
FIG. 15 is a connection diagram showing a sixth embodiment of this invention as applied to a distance relay.
FIG. 16 is a block diagram showing still another embodiment of this invention as applied to a directional relay.

When converter 1 contains a filter circuit, it causes transient phenomena when the input signal decreases rapidly. The operation of the relaying device when an external fault is interrupted will be considered. After an internal fault has been interrupted voltage $v_1$ attenuates in an oscillating manner but the phase comparison relay does not operate. FIG. 14 shows waveforms of various voltages utilized to operate phase detector 96 at one terminal A of one section of the transmission line. Electric quantities (voltages) with subscripts A show electric quantities obtainable at that terminal A whereas those with subscripts B show electric quantities obtainble at the opposite terminal B of the section. In the case of an external or through fault voltages $e_{1A}$ and $e_{1B}$ are out of phase by 180°. However, in order to have a clear understanding the voltage $e_{1B}$ at terminal B is inverted as $-e_{1B}$ and is shown on the same time axis as voltage $e_{1A}$. Voltages $e_{9A}$ and $e_{5A}$ correspond to output $e_9$ at terminal A whereas $e_5$ and $e_{10B}$ correspond to the output $e_{10}$ at the opposite terminal B. After rapid decrease, the phase difference between voltages $a_{1A}$ and $-e_{1B}$ increases with time. However, the outputs $e_{7A}$ and $e_{8B}$ from level setters 97 and 98 have the memories of the large current before rapid decrease, so that they vary in a direction not to cause level detectors 90 and 99 to produce outputs $e_{9A}$ and $e_{10B}$, after the rapid decrease of outputs $e_{9A}$ and $-e_{8B}$ gradually restore their original values. During this interval the difference between $e_{7A}$ and $-e_{8B}$ decreases gradually from a large value befor the rapid decrease. For this reason, even when the phase difference between $e_{1A}$ and $-e_{1B}$ is substantial outputs $e_{9A}$ and $e_{10B}$ will not be produced simultaneously. Further since output $e_{5A}$ is equal to output $e_{10B}$, outputs $e_{5A}$ and $e_{9A}$ will also not to be produced simultaneously. Accordingly, the phase comparator 96 at terminal A does not operate and an output is not produced. The phase comparator 96 at the other terminal B operates in the same manner. As is well known in the art, phase comparison relays provided on both ends of a section must exchange their informations (in this case $e_5$ and $e_{10}$) for effecting phase comparison. Transmitter 24 and receiver 25 are provided for this purpose and symbols $f$ and $f'$ show carrier frequencies utilized to transmit signals $e_5$ and $e_{10}$.

FIG. 15 shows a connection diagram of a distance relay embodying the invention, in which electric quantities or voltages have the same meaning as above described. The voltage V of the electric system is applied to a rectifier circuit 17 including means for converting a single phase voltage into a polyphase voltage for producing an output $e_{17}$ having a small ripple. Three half wave rectifiers 10, 11 and 47 are used to form a maximum value detection circuit. The output $v_{17}$ from rectifier circuit 44 and voltages $v_5$ and $v_9$ produced in a manner as above described are compared by rectifiers 10, 11 and 47 to produce voltage $v_{48}$ across a resistor 48 which is equal to the largest one of the three voltages $v_5$, $v_9$ and $v_{17}$.

In the circuit shown in FIG. 15 where the rectifier circuit 44 includes a single phase - three converter, the voltage $v_{48}$ is proportional to the single phase voltage $v$ but comprises a three phase full wave rectified voltage containing a small ripple. The operation of this embodiment will now be described with reference to FIG. 1. As long as the instantaneous value of voltage $v_4$ is smaller than $v_{17}$, level detector 12 will not produce an output so that the relay is inoperative. On the other hand if voltage $v_4$ is larger than $v_{17}$, the larger one of voltages $v_5$ and $v_9$, that is voltage $v_{48}$ is smaller than the peak value of $v_4$ at the maximum value thereof and during the steady state following such maximum value so that the level detector 12 produces an output for operating the relay. Further, during attenuation of voltage $v_4$ since voltage $v_9$ is larger than the peak value of voltage $v_4$, the relay is not operated in the same manner as in FIG. 1. Since voltage $v_4$ is proportional to input current I and voltage $v_{17}$ is proportional to input voltage V, the circuit shown in FIG. 15 does not operate, when the ratio I/V is smaller than the predetermined value, but operates at the speed of a conventional distance relay and resets to a high speed when the fault is cleared so that the current decreases rapidly.

The invention is also applicable to a directional relay as shown in FIG. 16 in which $v_1$ and $e_{12}$ are the same as that shown in FIG. 1. The voltage $v_1$ is impressed upon a pulse generator 50 for producing a pulse output $e_{19}$ when the voltage $v_1$ reaches its positive peak value. An electric quantity E utilized to judge the direction of current (in the case of a ground directional relay zero phase voltage or current flowing through the grounded neutral point of a transformer is used, whereas in the case of a short circuit directional relay, a phase shifted interphase voltage is used as the electric quantity) is applied to a level detector 51 for producing an output $e_{20}$ during each positive half cycle of the electric quantity E. The pulse $e_{19}$ and voltages $e_{12}$ and $e_{20}$ are applied to the inputs of an AND gate circuit 52 to produce an output $e_{21}$ when three inputs $e_{19}$, $e_{12}$ and $e_{20}$ present simultaneously.

As above described since the peak generator 50 is constructed to produce a pulse at each positive peak value of voltage $v_1$, when the electric quantity E is also at the positive half cycle so as to produce output $e_{20}$ and when output $e_{12}$ is provided at the same time the directional relay operates. Turning back again to FIG. 2b, during the interval in which voltage $v_{10}$ is increasing and during the steady state thereafter, at the instant when pulse $e_{19}$ is produced, output $e_{12}$ is also produced. When the electric quantity E has a phase difference of less than ±90° with respect to voltage $v_1$ output $e_{20}$ is also produced thereby producing output $e_{21}$ from the AND gate circuit 52. In other cases, that is during the attenuation of voltage $v_{10}$ and when the peak value of voltage $v_{10}$ is smaller than voltage $v_9$, the output $e_{12}$ is produced. Further, when the phase difference between voltage $v_{10}$ and electric quantity E is larger than ±90° the outputs $e_{19}$ and $e_{20}$ are not produced simultaneously, so that output $e_{21}$ is not produced. For this reason, with the circuit shown in FIG. 16, when current I corresponding to voltage $v_1$ and the electric quantity E have a predetermined relationship, and when the current I is above a predetermined value the directional relay can reset at a high speed. As above described the invention is applicable to not only an over current relay but also to a distance relay.

In the foregoing description, although the invention has been described in terms of a relay wherein current is used as the input and the relay is reset at a high speed during the attenuation of the current, it is clear that the invention is also applicable to a relay wherein a voltage input is used and the relay is required to reset at a high speed during the attenuation of the voltage.

I claim:

1. A ratio differential relay comprising first and second voltages respectively proportional to the currents at the opposite ends of a section of an electricl power system, each of said converters including a time delay element,
    first rectifier means for producing a third voltage proportional to said first voltage,
    second rectifier means for producing a fourth voltage proportional to said second voltage,
    third rectifier means for producing a fifth voltage proportional to the difference between said first and second voltages,
    fourth rectifier means for producing a sixth voltage which is smaller than said fifth voltage and proportional to the difference between said first and second voltages,
    a source of constant direct current voltage, means for producing a seventh voltage which is equal to the largest one of the sum of said third and fourth voltages, said sixth voltage and said constant direct current voltage,
    a level detector responsive to the difference in the levels of the currents created by said fifth voltage and said seventh voltage,
    an OFF delay timer responsive to the output of said level detector,
    and an ON delay timer responsive to the output from said OFF delay timer for producing an output for operating said ratio differential relay.

2. The ratio differential relay according to claim 1 wherein each of said first, second and fourth rectifier means is provided with a capacitor and a resistor which are connected in parallel whereby each capacitor acts as a memory device.

3. A protective relay device comprising
    a converter responsive to an electric quantity of an electric power system for producing an output proportional to said electric quantity, said converter including a time delay element,
    a detector responsive to said output from said converter, said detector including
        a first rectifier for producing a first DC voltage proportional to the output from said converter,
        a second rectifier for producing a second DC voltage smaller than said first DC voltage,
        a capacitor and a resistor for storing said second DC voltage and causing it to attenuate gradually,
        a source of constant DC voltage,
        means for producing a third DC voltage corresponding to the larger one of said first DC voltage and said constant voltage,
        a first level detector for producing an output when said first DC voltage exceeds a predetermined value,
        a first ON delay timer responsive to the output from said first level detector for producing an output with a time delay substantially equal to one cycle of said power system,
        a second level detector responsive to the difference between said second and third voltage for producing an output,
        a second ON delay timer which produces an output when the output from said first level detector persists for an interval slightly longer than one half cycle of said electric power system, and
        an output circuit which produces an output for operating the relay when the output from said first ON delay timer is applied provided that the second ON delay timer does not produce any output, and
    inhibit means for preventing misoperation of said detector due to an attenuating oscillation of said output caused by the transient phenomenon of said converter which occurs during the attenuation of said output.

4. A protective relay device according to claim 3 which further comprises a third ON delay timer connected to respond to the output from said first level detector for producing an output later than the output of said first ON delay timer, and an OR gate circuit having inputs connected to receive the outputs from said inhibit circuit and said third ON delay timer.

5. A protective relay device according to claim 3 which further comprises means for comparing the phases of the currents flowing at the opposite ends of one section of said electric power system, and means for operating said relay device when said phases are substantially the same.

6. A protective relay device according to claim 3, which further comprises at least two converters responsive to respective electric quantities of the prescribed terminals of an electric power system for producing an output proportional to said electric quantity, means for vectorially adding said output of said converters, and a detector responsive to an output from said means for adding.

7. A protective relay device according to claim 3, which further comprises means for detecting the ratio of voltage and current appearing at the one end of one section of said electric power system, and means for operating said relay device when said ratio exceeds the predetermined value.

8. In a phase comparison relay device wherein electric quantities at the opposite ends of a section of an electric power system are detected by detectors through converters each including a time delay element and compared by a phase detector at each end, the improvement wherein the detector at each end comprises first and second level detectors connected to respond to the output from the converter at one end of said section, first and second level setters responsive to different levels of the output from the converter at said one end for controlling said first and second level detectors respectively, said second level setter including
a full wave rectifier for producing a first voltage proportional to the output from said converter at said one end,
a capacitor and a resistor connected in parallel across said full wave rectifier,
a source of constant DC voltage, and
means for producing a second voltage which is proportional to the larger one of said first voltage and said constant DC voltage for producing a third voltage applied to said second level detector, a transmitter for transmitting the output from said first level detector at said one end to the other end of the section,
a receiver for receiving the output of the first level detector at the other end of the section, and
a phase detector for detecting the phase difference between the output between said second level detector at said one end and the output from said receiver for producing an output for operating said phase comparison relay device.

9. The phase comparison relay device according to claim 8 wherein said first level setter comprises a full wave rectifier for producing a first voltage proportional to the output from said converter at said one end, a capacitor and a first resistor connected in parallel across said full wave rectifier, a source of constant DC voltage, a Zener diode and a second resistor which are connected in series across said first resistor, and means for producing the difference between the voltage across said second resistor and said constant DC voltage for controlling said second level detector.

10. The phase comparison relay device according to claim 8 which further comprises a third rectifier means including a single phase - poly phase converter for producing a fourth DC voltage having a small ripple, and said means for producing said third DC voltage comprises means for producing said third DC voltage corresponding to the largest one of said first, second and fourth voltages and said constant voltage.

11. The phase comparison relay device according to claim 8 which further comprises a pulse generator responsive to the output from said converter for producing a pulse output, means for judging the direction of the current flowing through said electric power system, and an AND gate circuit with its inputs connected to receive said pulse output, the output of said means for judging the direction of the current and the output from said level detector.

* * * * *